United States Patent
Raiser et al.

(10) Patent No.: US 8,373,381 B2
(45) Date of Patent: Feb. 12, 2013

(54) DC/DC-LESS COUPLING OF MATCHED BATTERIES TO FUEL CELLS

(75) Inventors: Stephen Raiser, Egelsbach (DE);
George R. Woody, Wiesbaden (DE);
Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1600 days.

(21) Appl. No.: 11/112,103

(22) Filed: Apr. 22, 2005

(65) Prior Publication Data

US 2006/0238033 A1   Oct. 26, 2006

(51) Int. Cl.
*H01M 10/44* (2006.01)
*H01M 10/46* (2006.01)

(52) U.S. Cl. .......................... 320/101; 320/132

(58) Field of Classification Search .............. 320/101, 320/132, 149; 324/426, 430
See application file for complete search history.

(56) References Cited

U.S. PATENT DOCUMENTS

| | | | |
|---|---|---|---|
| 5,482,790 A | 1/1996 | Yamada et al. ................. 429/9 |
| 6,158,537 A | 12/2000 | Nonobe ....................... 180/65.3 |
| 6,321,145 B1 | 11/2001 | Rajashekara ................. 701/22 |
| 6,337,557 B1 * | 1/2002 | Kates et al. .................. 320/112 |
| 6,429,613 B2 * | 8/2002 | Yanase et al. ................ 318/139 |
| 6,642,692 B2 | 11/2003 | Kinoshita ..................... 320/112 |
| 6,656,618 B2 | 12/2003 | Iwase .......................... 429/23 |
| 2002/0114986 A1 | 8/2002 | Aoyagi et al. ................. 429/23 |
| 2003/0076109 A1 | 4/2003 | Verbrugge et al. ............ 324/427 |
| 2003/0094816 A1 | 5/2003 | Kazama ....................... 290/40 C |
| 2003/0118876 A1 | 6/2003 | Sugiura et al. ................. 429/9 |
| 2003/0146026 A1 | 8/2003 | Enjoji et al. .................. 180/65.1 |
| 2003/0184256 A1 | 10/2003 | Kopf et al. .................... 320/101 |
| 2003/0188700 A1 | 10/2003 | Mitsuhashi et al. .......... 123/25 C |
| 2003/0194586 A1 | 10/2003 | Sugiura et al. ................ 429/13 |
| 2003/0211377 A1 | 11/2003 | Holmes et al. ................. 429/34 |
| 2003/0230671 A1 | 12/2003 | Dunn .......................... 244/53 R |
| 2003/0232237 A1 | 12/2003 | Nakagawa et al. ............ 429/61 |
| 2004/0009380 A1 * | 1/2004 | Pearson ....................... 429/23 |
| 2004/0096711 A1 * | 5/2004 | Zinser et al. .................. 429/13 |
| 2006/0035115 A1 * | 2/2006 | Norimatsu et al. ............. 429/9 |

FOREIGN PATENT DOCUMENTS

| | | |
|---|---|---|
| JP | 10-40931 A | 2/1989 |
| JP | 8-68231 | 3/1996 |
| JP | 2002324562 A * | 11/2002 |
| JP | 2005-151643 A | 6/2005 |
| JP | 2005-523722 A | 8/2005 |
| WO | WO 02/15316 A1 | 2/2002 |

OTHER PUBLICATIONS

Verbrugge, Baker, and Koch, "Mathematical Modeling of High-Power Density Insertion Electrodes for Lithium Ion Batteries", *Journal of Power Sources*, 110 (2002) 295-309.

* cited by examiner

*Primary Examiner* — Ramy Ramadan
(74) *Attorney, Agent, or Firm* — John A. Miller; Miller IP Group, PLC

(57) ABSTRACT

A fuel cell system that employs a matched battery that matches the battery voltage to a fuel cell power bus voltage so as to eliminate the need for a DC/DC converter. The internal characteristics and parameters of the matched battery allow it to operate over the large load dependent voltage swing of the fuel cell, and prevent the battery state of charge from going below a damaging value. The battery type, number of battery cells and the battery internal impedance are selected to provide the desired matching. In one embodiment, the battery is a lithium ion battery. The system also includes a diode electrically coupled to the power bus line and a by-pass switch electrically coupled to the power bus line in parallel with the diode. The by-pass switch is selectively opened or closed to allow the fuel cell stack to recharge the battery and prevent the battery from being overcharged.

17 Claims, 2 Drawing Sheets

DC/DC-LESS COUPLING OF MATCHED BATTERIES TO FUEL CELLS

BACKGROUND OF THE INVENTION

1. Field of the Invention

This invention relates generally to a fuel cell system and, more particularly, to a fuel cell system that employs a matched battery that eliminates the need for a DC/DC converter.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

Most fuel cell vehicles are hybrid vehicles that employ a supplemental power source in addition to the fuel cell stack, such as a DC battery or super capacitor. The power source provides supplemental power for the various vehicle auxiliary loads, for system start-up and during high power demands when the fuel cell stack is unable to provide the desired power. The fuel cell stack provides power to a traction motor through a DC voltage bus line for vehicle operation. The battery provides supplemental power to the voltage bus line during those times when additional power is needed beyond what the stack can provide, such as during heavy acceleration. For example, the fuel cell stack may provide 70 kW of power. However, vehicle acceleration may require 100 kW of power. The fuel cell stack is used to recharge the battery at those times when the fuel cell stack is able to provide the system power demand. The generator power available from the traction motor during regenerative braking is also used to recharge the battery.

In the hybrid vehicle discussed above, a bi-directional DC/DC converter is typically necessary to step up the DC voltage from the battery to match the battery voltage to the bus line voltage dictated by the voltage output of the fuel cell stack and step down the stack voltage during battery recharging. However, DC/DC converters are relatively large, costly and heavy, providing obvious disadvantages. It is desirable to eliminate the DC/DC converter from a fuel cell vehicle including a supplemental power source.

There have been various attempts in the industry to eliminate the DC/DC converter in fuel cell powered vehicles by providing a power source that is able to handle the large voltage swing coming from the fuel cell stack with its V/I characteristic (polarization curve) over the operating conditions of the vehicle. FIG. 2 is a graph with current density on the horizontal axis and fuel cell stack voltage on the vertical axis showing a typical fuel cell stack V/I characteristic or polarization curve of a stack including 400 cells in series. In one known system, a super-capacitor is used as the supplemental power source. However, the super-capacitor is limited by how much it can be discharged because of its low energy content. Also, the super-capacitor requires a power device to ramp up the super-capacitor voltage at system start-up. Certain types of batteries have also been used to eliminate the DC/DC converter in vehicle fuel cell systems. However, these systems were limited by the ability to discharge the battery beyond a certain level. In other words, these types of batteries would be damaged as a result of large voltage swings on the DC bus line during the operation of the system.

SUMMARY OF THE INVENTION

In accordance with the teachings of the present invention, a fuel cell system is disclosed that employs a matched battery that matches the battery voltage to a power bus line voltage so as to eliminate the need for a DC/DC converter. The internal characteristics and parameters of the matched battery allow it to operate over a large voltage discharge swing as dictated by the fuel cell V/I characteristic, and prevent the battery from being over-discharged. The battery type, number of battery cells and the battery internal impedance are designed to provide the desired matching. In one embodiment, the battery is a lithium ion battery. The system also includes a diode electrically coupled to the power bus line and a by-pass switch electrically coupled to the bus line in parallel with the diode. The by-pass switch is selectively opened and closed to allow the fuel cell stack to recharge the battery and prevent the battery from being overcharged.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that employs a matched battery is merely exemplary in nature, and is in no way intended to limit the invention or its applications or uses. For example, the fuel cell system described herein has particular application for a vehicle power source. However, the fuel cell system may have other applications beyond vehicle applications.

Figure 1:
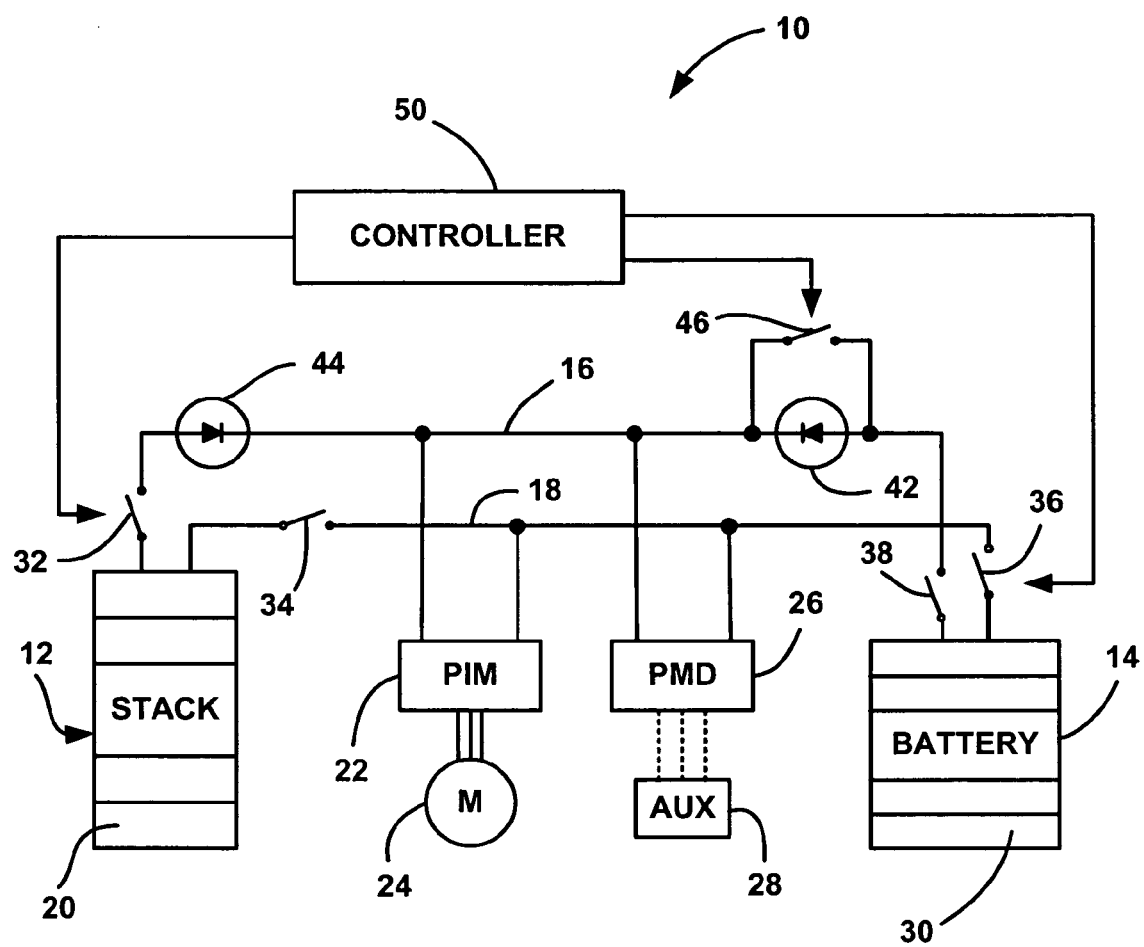
FIG. 1 is a schematic block diagram of a fuel cell system including a matched battery, according to an embodiment of the present invention.
Figure 2:
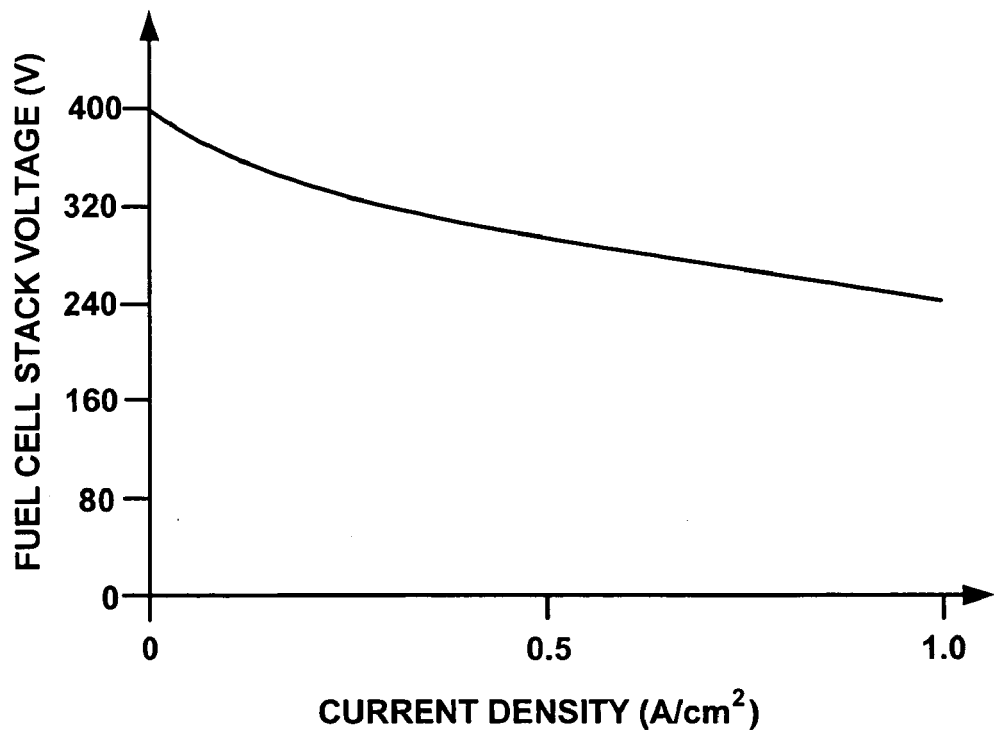
FIG. 2 is a graph with current density on the horizontal axis and fuel cell stack voltage on the vertical axis showing a typically fuel cell V/I characteristic or polarization curve of a stack including 400 cells in series.

FIG. 1 is a schematic block diagram of a fuel cell system 10 including a fuel cell stack 12 having a stack of fuel cells 20 electrically coupled in series. The fuel cell stack 12 provides electrical power to a high voltage bus line, represented here as positive bus line 16 and negative bus line 18. In a vehicle fuel cell application, the fuel cell stack 12 may include about 400 cells 20. In this application, the fuel cell stack 12 provides about 260 volts of power on the bus lines 16 and 18 during a full load demand, and provides about 400 volts on the bus lines 16 and 18 during a vehicle idle condition. A switch 32 selectively disengages the positive bus line 16 from the fuel cell stack 12 and a switch 34 selectively disengages the negative bus line 18 from the fuel cell stack 12 to electrically disconnect the fuel cell stack 12 from the system 10 for safety purposes during shutdown.

According to the invention, the fuel cell system 10 includes a matched battery 14 electrically coupled to the bus lines 16 and 18. The battery includes a certain number of battery cells 30. As will be discussed in detail below, the output voltage of the battery 14 matches to the voltage on the bus lines 16 and 18 dictated by the output of the fuel cell stack 12 so that a DC/DC converter is not necessary. The battery 14 provides additional power to the bus lines 16 and 18 during those times when the stack 12 is unable to provide the power demand, such as during heavy acceleration, and provides supplemental power to the various vehicle systems when the fuel cell stack 12 is not operating. In one example, 70 kW of power is provided by the fuel cell stack 12, and an additional 30 kW of power is provided by the battery 14. A switch 36 selectively disengages the battery 14 from the negative bus line 18 and a switch 38 selectively disengages the battery 14 from the positive bus line 16 to electrically disconnect the battery 14 from the system 10 for safety purposes during shutdown.

A blocking diode 44 positioned within the positive bus line 16 prevents electrical current from flowing back into the fuel cell stack 12 and a blocking diode 42 prevents electrical current from flowing into the battery 14 when it is fully charged. A by-pass switch 46 by-passes the diode 42 so that the battery 14 can be recharged by the fuel cell stack 12 and during regenerative braking. For example, in certain operating conditions, the battery 14 may be completely charged, yet the fuel cell stack 12 is still outputting current that is available to charge the battery 14. In this operating condition, it is desirable to disconnect the battery 14 from the bus line 16 to prevent further charging of the battery 14, which could damage the battery 14. The fuel cell system 10 would include various sensors and the like for monitoring, for example, the temperature of the battery 14 and the state of charge of the battery 14 to control the position of the by-pass switch 46. A controller 50 controls the switches 32, 34, 36, 38 and 46, as well as other system devices, consistent with the discussion herein.

The fuel cell system 10 includes a power inverter module (PIM) 22 electrically coupled to the bus lines 16 and 18 and an AC or DC traction motor 24. The PIM 22 converts the DC voltage on the bus lines to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction motor 24 is operating as a generator, electrical AC power from the motor 24 is converted to DC power by the PIM 22, which is then applied to the bus lines 16 and 18 to recharge the battery 14. The blocking diode 44 prevents the regenerative electrical energy applied to the bus lines 16 and 18 from flowing into the fuel cell stack 12, which could otherwise damage the stack 12.

The fuel cell system 10 also includes a power management and distribution (PMD) device 26 electrically coupled to the bus lines 16 and 18 that converts the high voltage power on the bus lines 16 and 18 to a lower DC voltage or AC voltage suitable for auxiliary units 28, such as lights, heater, etc., in the vehicle.

Figure 3:
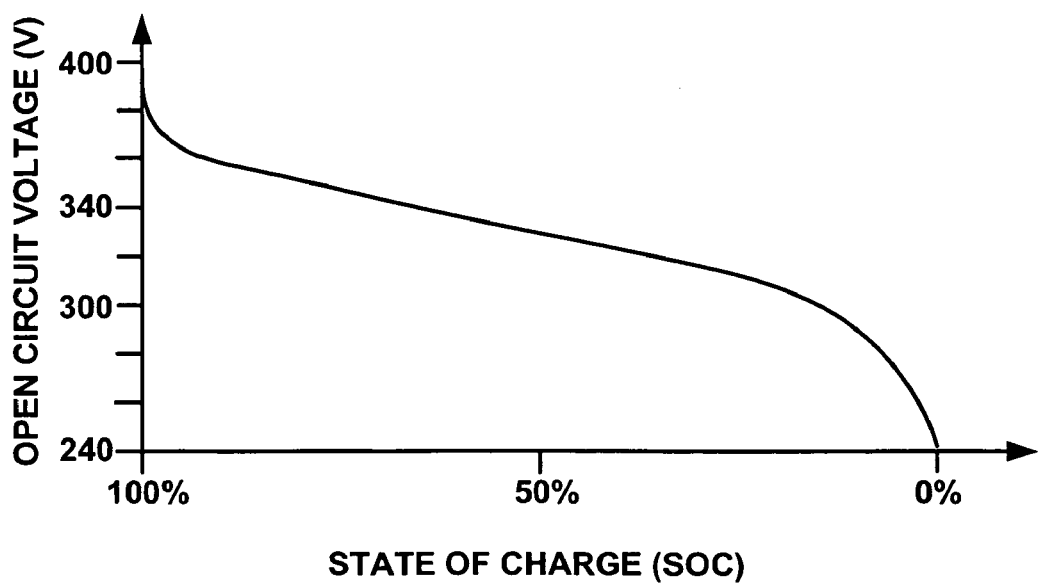
FIG. 3 is a graph with state of charge (SOC) on the horizontal axis and battery pack open circuit voltage on the vertical axis showing a typical lithium ion battery including 100 cells in series.

According to the invention, the battery 14 is a matched battery in that the characteristics of the battery 14 provide a discharge curve having a relatively high slope of voltage versus state of charge that allows it to be matched to the voltage on the bus lines 16 and 18 over a large voltage swing, thus eliminating the need for a DC/DC converter. Particularly, the battery 14 has a discharge or state of charge (SOC) characteristic that allows it to discharge to the voltage dictated by the fuel cell stack 12 under the full stack load without damaging the battery 14. In other words, the battery cell count must be selected so that the battery open circuit voltage (OCV) is at or above the minimum stack voltage during full fuel cell stack power. FIG. 3 is a graph with SOC on the horizontal axis and battery pack open circuit voltage on the vertical axis showing a typical lithium ion battery including 100 cells in series. When the battery 14 is being used to provide supplemental power, it will discharge at a certain rate until the battery OCV reaches the voltage output of the stack 12. At this point, the output voltage of the stack 12 and the idle voltage output of the battery 14 are equal, and the characteristics of the matched battery 14 prevent it from discharging any further since there is no more battery current driving the voltage differential.

The battery 14 is matched to the voltage output of the fuel cell stack 12 by appropriately selecting the battery type, the number of the battery cells 30, the internal impedance of the battery 14 and the cell size, including Ah rating and internal resistance, so that the battery 14 will not be over-discharged. The number of the cells 30 determines the voltage necessary to match the low voltage output of the fuel cell stack 12 at high loads.

The battery 14 must be matched to protect against over-discharge. This is done by selecting a battery with a significant changing voltage over state of charge (SOC) and selecting the number of cells so that $V\_fuelcell\_min \geq V\_batcell\_OCV \ (SOC\_min) \times n\_cells\_bat$, where $V\_fuelcell\_min$ is the minimum voltage of the fuel cell (full load voltage, $V\_batcell\_OCV \ (SOC\_min)$ is the open circuit voltage of a single battery cell at the minimum allowed battery state of charge, and $n\_cells\_bat$ is the number of battery cells connected in series.

The battery 14 must also be matched to protect against over-current. This protection is provided by selecting the battery size so that the battery impedance and the fuel cell impedance limit the current to an acceptable level for all practical SOC conditions does this. For example, bigger batteries can have lower internal resistance and hence limit the current to higher values and vice versa. The battery impedance can also be increased artificially by using, for example, thinner or thicker interconnects and resistors, or resistive battery wires that adds or reduces the battery system impedance, and hence decreases or increases the battery currents.

The battery must also be matched to protect against over-charge. This is provided by the diode/contactor combination in front of the battery 14. If the contactor is opened, any further charge current of the battery is prohibited by the diode blocking functionality.

In one embodiment, the battery 14 is a lithium ion battery to provide the matched characteristic. Also, it may be desirable that the lithium ion battery be a lithium ion battery having a disordered carbon anode as opposed to a highly ordered graphic anode because disordered carbons contribute to large slopes in the voltage versus SOC curve of the battery. Other battery types may also be suitable, including nickel-metal-hydride (NiMH) batteries. In one example, the battery 14 is a NiMH battery having 240 cells and an output power of 30 kW.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
an electrical power bus line;
a fuel cell stack electrically coupled to the power bus line; and
a matched battery electrically coupled to the power bus line, said battery being matched to a full voltage swing of the fuel cell stack as defined by a voltage/current characteristic of the fuel stack by the number of battery cells, a discharge rate of the battery and state of charge (SOC) depending parameters of the battery that prevent it from discharging below a damaging SOC so that the voltage/current characteristic of the fuel cell stack does not need to be changed to match the battery.

2. The system according to claim 1 further comprising a blocking diode electrically coupled to the power bus line and a by-pass switch electrically coupled to the power bus line in parallel with the diode, said by-pass switch being selectively opened or closed to allow the fuel cell stack to recharge the battery and prevent the battery from being overcharged.

3. The system according to claim 1 wherein the SOC parameters of the battery include the voltage and the internal impedance of the battery.

4. The system according to claim 1 wherein the battery is matched to protect against battery over-discharge, battery over-current and battery over-charge.

5. The system according to claim 1 wherein the battery is selected from the group consisting of lithium ion batteries and nickel-metal-hydride batteries.

6. The system according to claim 1 wherein the battery is a nickel-metal-hydride battery having 240 cells and an output power of 30 kW.

7. The system according to claim 1 further comprising an AC or DC traction motor system electrically coupled to the power bus line, said motor system providing a voltage on the power bus line during regenerative braking for recharging the battery.

8. The system according to claim 1 wherein the fuel cell system is on a vehicle.

9. A fuel cell system comprising:
an electrical power bus line;
a fuel cell stack electrically coupled to the power bus line; and
a lithium ion battery electrically coupled to the power bus line, said battery including a predetermined number of battery cells and a certain internal impedance that allow the battery to be matched to a full voltage swing of the fuel cell stack defined by a voltage/current characteristic of the fuel stack by its state of charge (SOC) characteristics to the voltage on the power bus line provided by the fuel cell stack so that the voltage/current characteristic of the fuel cell stack does not need to be changed to match the battery.

10. The system according to claim 9 wherein the number of cells of the battery prevent it from discharging below a damaging state of charge.

11. The system according to claim 9 wherein the battery is matched to protect against battery over-discharge, battery over-current and battery over-charge.

12. The system according to claim 9 further comprising a blocking diode electrically coupled to the power bus line and a by-pass switch electrically coupled to the power bus line in parallel with the diode, said by-pass switch being selectively opened and closed to allow the fuel cell stack to recharge the battery and prevent the battery from being overcharged.

13. The system according to claim 9 further comprising an AC or DC traction motor system electrically coupled to the power bus line, said motor system providing a voltage on the bus line during regenerative braking for recharging the battery.

14. The system according to claim 9 wherein the fuel cell system is on a vehicle.

15. A fuel cell system for a vehicle, said system comprising:
an electrical power bus line;
a fuel cell stack electrically coupled to the power bus line;
a lithium ion battery electrically coupled to the power bus line, said battery including a predetermined number of battery cells and a certain internal impedance that allow the battery to be matched to a full voltage swing of the fuel cell stack defined by a voltage/current characteristic of the fuel stack by its discharge characteristics to the voltage on the power bus line provided by the fuel cell stack and prevent it from discharging below a damaging state of charge so that the voltage/current characteristic of the fuel cell stack does not need to be changed to match the battery; and
a blocking diode electrically coupled to the power bus line and a by-pass switch electrically coupled to the power bus line in parallel with the diode, said by-pass switch being selectively opened or closed to allow the fuel cell stack to recharge the battery or prevent the battery from being overcharged.

16. The system according to claim 15 wherein the battery is matched to protect against battery over-discharge, battery over-current and battery over-charge.

17. The system according to claim 15 further comprising an AC or DC traction motor system electrically coupled to the power bus line, said motor system providing a voltage on the bus line during regenerative braking for recharging the battery.

* * * * *